United States Patent
Brown

(10) Patent No.: US 12,539,919 B2
(45) Date of Patent: *Feb. 3, 2026

(54) SINGLE-LEVEL FIFTH WHEEL TRAVEL TRAILER WITH PASS-THROUGH STORAGE COMPARTMENT

(71) Applicant: Forest River, Inc., Elkhart, IN (US)

(72) Inventor: Ronald Wesley Brown, Elkhart, IN (US)

(73) Assignee: Forest River, Inc., Elkhart, IN (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/773,869

(22) Filed: Jul. 16, 2024

(65) Prior Publication Data

US 2024/0367723 A1    Nov. 7, 2024

Related U.S. Application Data

(63) Continuation of application No. 17/185,245, filed on Feb. 25, 2021, now Pat. No. 12,060,109.
(Continued)

(51) Int. Cl.
| | |
|---|---|
| *B62D 21/20* | (2006.01) |
| *B60P 3/34* | (2006.01) |
| *B60P 3/36* | (2006.01) |
| *B60H 1/24* | (2006.01) |
| *B60R 3/00* | (2006.01) |
| *B60R 15/00* | (2006.01) |
| *B62D 25/06* | (2006.01) |

(Continued)

(52) U.S. Cl.
CPC ........... *B62D 21/20* (2013.01); *B60P 3/34* (2013.01); *B60P 3/36* (2013.01); *B60H 1/241* (2013.01); *B60R 3/00* (2013.01); *B60R 15/00* (2013.01); *B62D 25/06* (2013.01); *B62D 25/20* (2013.01); *B62D 53/08* (2013.01); *B62D 63/06* (2013.01)

(58) Field of Classification Search
CPC ...... B60P 3/32; B60P 3/34; B60P 3/36; B62D 21/20
See application file for complete search history.

(56) References Cited

U.S. PATENT DOCUMENTS

| | | |
|---|---|---|
| 4,719,954 A | 1/1988 | Curtis et al. |
| 4,728,144 A | 3/1988 | Crean |

(Continued)

FOREIGN PATENT DOCUMENTS

CA    2343913 A1    10/2001

*Primary Examiner* — Jason S Morrow
(74) *Attorney, Agent, or Firm* — Taft Stettinius & Hollister LLP; Stephen F. Rost

(57) ABSTRACT

A recreational fifth wheel travel trailer includes a frame, a wheel for supporting the frame on a ground surface, and a body supported by the frame. The body has a length defined between a front end and a rear end of the body. A roof is coupled to the body, and an interior space is defined in the body between a floor and the roof. The travel trailer includes a door for providing entry to the interior space, a step for gaining access to the floor of the interior space, and a storage compartment at least partially formed by the body. The storage compartment is located below the floor of the interior space. The floor is defined along a plane from the rear end of the body to a location near the front end thereof such that the interior space is accessible without traversing more than a single step.

20 Claims, 6 Drawing Sheets

Related U.S. Application Data

(60) Provisional application No. 62/983,861, filed on Mar. 2, 2020.

(51) Int. Cl.
    *B62D 25/20*           (2006.01)
    *B62D 53/08*           (2006.01)
    *B62D 63/06*           (2006.01)

(56) References Cited

U.S. PATENT DOCUMENTS

| | | |
|---|---|---|
| 6,260,909 B1 | 7/2001 | Crean et al. |
| 6,502,894 B1 * | 1/2003 | Ingram .................. B62D 21/20 |
| | | 280/789 |
| 6,807,735 B2 | 10/2004 | Crean |
| 7,000,978 B1 | 2/2006 | Messano |
| 7,004,525 B1 * | 2/2006 | Turnbow .................. B60P 3/32 |
| | | 296/24.31 |
| 7,097,224 B2 | 8/2006 | Lester et al. |
| 7,100,933 B2 | 9/2006 | Zackovich et al. |
| 7,338,109 B1 | 3/2008 | Crean |
| 7,338,335 B1 | 3/2008 | Messano |
| 7,938,427 B2 | 5/2011 | Ousley |
| 7,967,338 B1 * | 6/2011 | Anderson .................. B60P 3/36 |
| | | 280/789 |
| 8,419,037 B2 | 4/2013 | Graber et al. |
| 9,290,213 B2 | 3/2016 | Connor |
| 10,246,911 B2 | 4/2019 | Marasco |
| 11,325,656 B2 | 5/2022 | Glickman et al. |
| 11,667,230 B2 * | 6/2023 | Snyder .................. B62D 21/16 |
| | | 296/168 |
| 11,697,460 B2 * | 7/2023 | Lozier .................. B62D 27/023 |
| | | 280/781 |
| 11,760,248 B2 * | 9/2023 | Adams .................. B60P 3/36 |
| | | 296/24.33 |
| D1,029,691 S * | 6/2024 | Wisler .................. D12/103 |
| 2005/0161974 A1 | 7/2005 | Atcravi |
| 2005/0230989 A1 | 10/2005 | Nebel |
| 2022/0111781 A1 | 4/2022 | Alpin |
| 2022/0145613 A1 | 5/2022 | Haynes |
| 2022/0297588 A1 | 9/2022 | Point et al. |
| 2022/0340070 A1 | 10/2022 | Barth et al. |
| 2023/0234647 A1 | 7/2023 | Bullock et al. |
| 2023/0347811 A1 | 11/2023 | Mullett |
| 2023/0356782 A1 | 11/2023 | Snyder et al. |

* cited by examiner

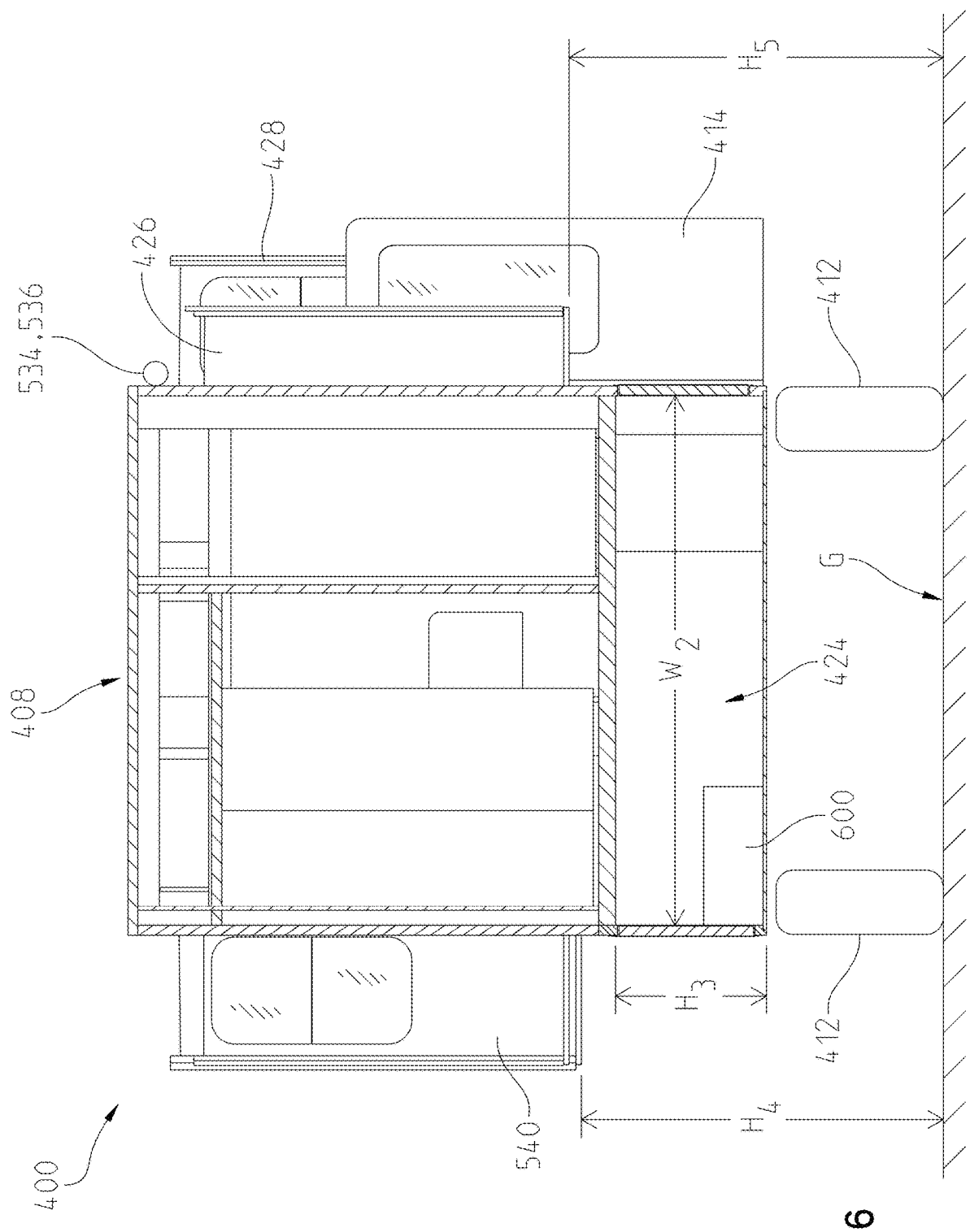

SINGLE-LEVEL FIFTH WHEEL TRAVEL TRAILER WITH PASS-THROUGH STORAGE COMPARTMENT

RELATED APPLICATIONS

This application is a continuation of U.S. patent application Ser. No. 17/185,245, filed Feb. 25, 2021, and which claims the benefit of U.S. Provisional Patent Application Ser. No. 62/983,861, filed Mar. 2, 2020 and entitled "Single-Level Fifth Wheel Travel Trailer with Pass-Through Compartment," the disclosures of which are hereby incorporated by reference in their entirety.

FIELD OF THE DISCLOSURE

The present disclosure relates to a travel trailer, and more particularly to a single-level fifth wheel travel trailer.

BACKGROUND

Recreational fifth wheel travel trailers provide individuals with spacious, comfortable and transportable lodging. In particular, a typical fifth wheel travel trailer comprises a housing member having a multi-level interior living space formed therein, a multi-level chassis adapted to support the housing member, and a carriage member having a plurality of wheels interposed between the chassis and a supporting surface so as to enable the trailer to travel on the supporting surface. Furthermore, the typical fifth wheel trailer is adapted to detachably mount to a towing vehicle so that a front end of the trailer extends beyond the load bearing rear wheels of the towing vehicle so as to enable the towing vehicle to essentially act as a fifth wheel.

Since fifth wheel trailers are currently available with lengths as great as forty-five feet (and possibly longer) and pop-out sections that provide the housing member with increased width, their interior living spaces are able to resemble that of a nicely appointed home. For example, a fifth wheel travel trailer can include a large kitchen, a large bathroom, a large bedroom, and a large living area. Moreover, these trailers typically include multiple water storage tanks for supplying hot and cold water as well as for storing waste water, wiring for distributing electrical power and a central heating/ventilation/air conditioning (HVAC) system for providing desirable environmental conditions within the interior living space.

SUMMARY

In one embodiment of the present disclosure, a recreational fifth wheel travel trailer includes a frame including a hitch configured to be coupled to a towing vehicle; one or more wheels for supporting the frame on a ground surface; a body supported by the frame, the body having a length defined between a front end and a rear end of the body; a roof coupled to the body and extending from the front end to the rear end; an interior space defined in the body between a floor and the roof, the interior space being located at a first height above the ground surface; a door for providing entry to the interior space; at least one step for gaining access to the floor of the interior space; and a storage compartment at least partially formed by the body, the storage compartment being located below the floor of the interior space; wherein, the floor is defined along a plane from the rear end of the body to a location near the front end thereof such that the interior space is accessible without traversing more than a single step.

In one example of this embodiment, the floor is defined along the plane from the rear end to the front end. In a second example, a storage door coupled to the body for accessing the storage compartment. In a third example, a second height is defined between the floor and the roof at the front end of the body; a third height is defined between the floor and the roof at the rear end of the body; the second and third heights being substantially the same. In a fourth example, the one or more wheels are rotatable about an axle, the axle being an underslung axle.

In a fifth example, the storage compartment comprises an interior being open between the rear end and a location adjacent the front end. In a sixth example, utility equipment is disposed within the interior of the storage compartment. In a seventh example, the utility equipment comprises at least one of an air conditioner unit, a furnace, and a water heater. In an eighth example, a drain is defined in a floor surface of the storage compartment, the drain being located near the utility equipment for water to drain out of the storage compartment.

In a ninth example, an air duct is located in the interior of the storage compartment. In a tenth example, at least one slideout is coupled to the body, the slideout being movable between a stowed position and a deployed position. In another example, at least one awning is coupled to the body. In a further example, the interior space is defined between a ceiling, the floor, and one or more walls formed by the body; a distance between the ceiling and the floor is substantially the same throughout the interior space.

In another embodiment of the present disclosure, a recreational fifth wheel travel trailer includes a frame including a hitch configured to be coupled to a towing vehicle; one or more wheels for supporting the frame on a ground surface; a body supported by the frame, the body having a length defined between a front end and a rear end of the body; a roof coupled to the body and extending from the front end to the rear end; an interior space defined in the body between a floor and the roof; a door for providing entry to the interior space; and a storage compartment at least partially formed by the body, the storage compartment being located below the floor of the interior space; wherein, the storage compartment comprises an interior having a first end located at the rear end of the body and a second end located near the front end, the interior being open between the first end and the second end.

In one example of this embodiment, the interior of the storage compartment is free of any wall between the first end and the second end. In a second example, a storage door is coupled to the body for gaining access to the interior of the storage compartment. In a third example, the floor is defined along a horizontal plane from the rear end of the body to a location near the front end thereof such that the interior space is traversable therebetween without encountering more than a single step.

In another example, the trailer includes one or more steps for accessing the interior from the ground surface. In yet another example, utility equipment is disposed within the interior of the storage compartment.

According to a further embodiment of the present disclosure, a recreational fifth wheel travel trailer includes a frame including a hitch configured to be coupled to a towing vehicle, the frame comprising a straight frame portion and a raised portion; a plurality of wheels for supporting the frame on a ground surface; a body supported by the frame, the body having a length defined between a front end and a rear end of the body; a roof coupled to the body and extending from the front end to the rear end, the roof being sloped in at least one direction; an interior space defined in the body between a floor and a ceiling, the interior space spanning a length from the rear end to a location near the front end; a door for providing entry to the interior space; a plurality of steps for accessing the door from the ground surface; a storage compartment at least partially formed by the body and being located below the floor of the interior space, the storage compartment comprising an interior having a first end located at the rear end of the body and a second end located near the front end, the interior being open between the first end and the second end; at least one storage door coupled to the body and providing access to the interior of the storage compartment in its open position; and a utility equipment disposed within the interior of the storage compartment, the utility equipment comprising at least one of an air conditioner unit, a furnace, and a water heater; wherein, the floor is defined along a horizontal plane from the rear end of the body to a location near the front end thereof such that a distance between the floor and ceiling remains substantially the same throughout the interior space.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 6 is rear partial cross-sectional view of the trailer of FIG. 4 taken along lines 3-3.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Conventional fifth wheel travel trailers generally include different living spaces separated from one another by a set of stairs. For example, a main living area may be located on a main level of the trailer, whereas the bedroom and bathroom are located on an upper level that requires a person to ascend steps to reach. An example of this is shown in FIG. 1.

Figure 1:
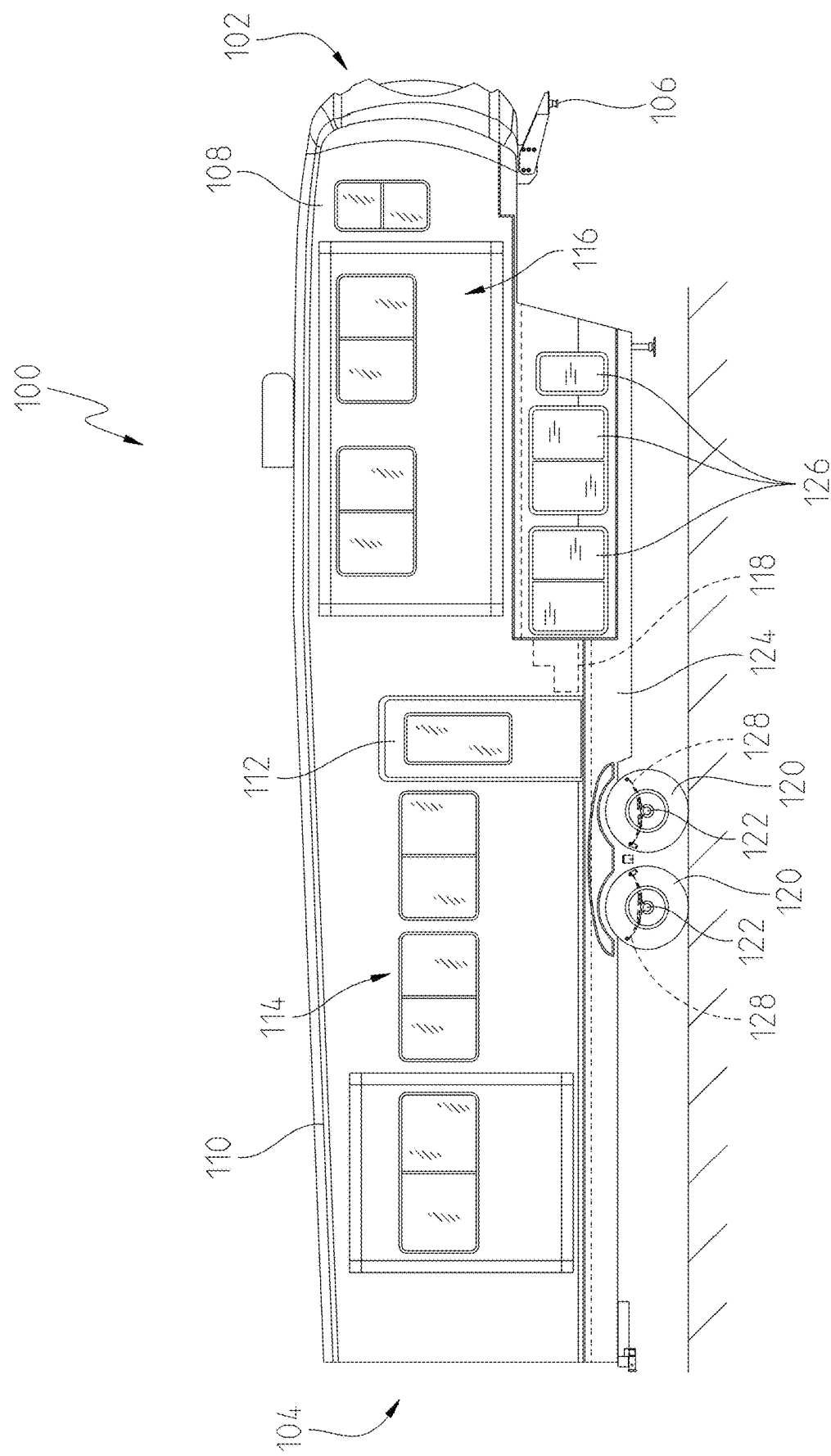
FIG. 1 is a side view of a conventional multi-level fifth wheel travel trailer.

In FIG. 1, a conventional multi-level fifth wheel travel trailer 100 is shown having a front 102 and a rear 104. A hitch 106 may be located at the front 102 of the trailer 100 for releasably coupling to a towing vehicle or machine (not shown). A fifth wheel travel trailer such as the one embodied in FIG. 1 includes a hitch that engages with a U-shaped coupling component on a towing vehicle or machine. With a truck, the coupling component may be mounted in a bed area of the truck at a location forward of the rear axle. Fifth wheel hitches can provide better handling and maneuverability during transport than a trailer that couples to a coupler mounted to a rear bumper of a towing vehicle.

The trailer 100 comprises a body 108 that defines a sloping roof 110 as shown in FIG. 1. The roof may slope rearward so that rain, snow and other water flows off of the roof 110 towards the rear 104. The body 108 may be supported by a chassis or drop frame (not shown), which is supported by one or more wheels 120 coupled thereto. Each wheel 120 is configured along an axle 122. The body 108 may include skirting 124, as shown in FIG. 1. A leaf spring 128, which forms part of a suspension of the travel trailer 100, is also shown.

The trailer 100 also includes a door 112 to gain access to an interior of the trailer 100. Although not shown, a set of steps are provided at the door 112. Once inside, the conventional trailer 100 includes a first living area 114 and a second living area 116. In the example of FIG. 1, the first living area 114 may include a kitchen, table, chairs, sofa, and entertainment options, whereas the second living area 116 may include a bedroom, closet and bathroom. A second set of steps 118 is located between the two living areas to provide access therebetween.

In FIG. 1, the trailer 100 is shown including a plurality of storage doors 126. Each storage door 126 may provide access to an individual storage compartment.

Figure 2:
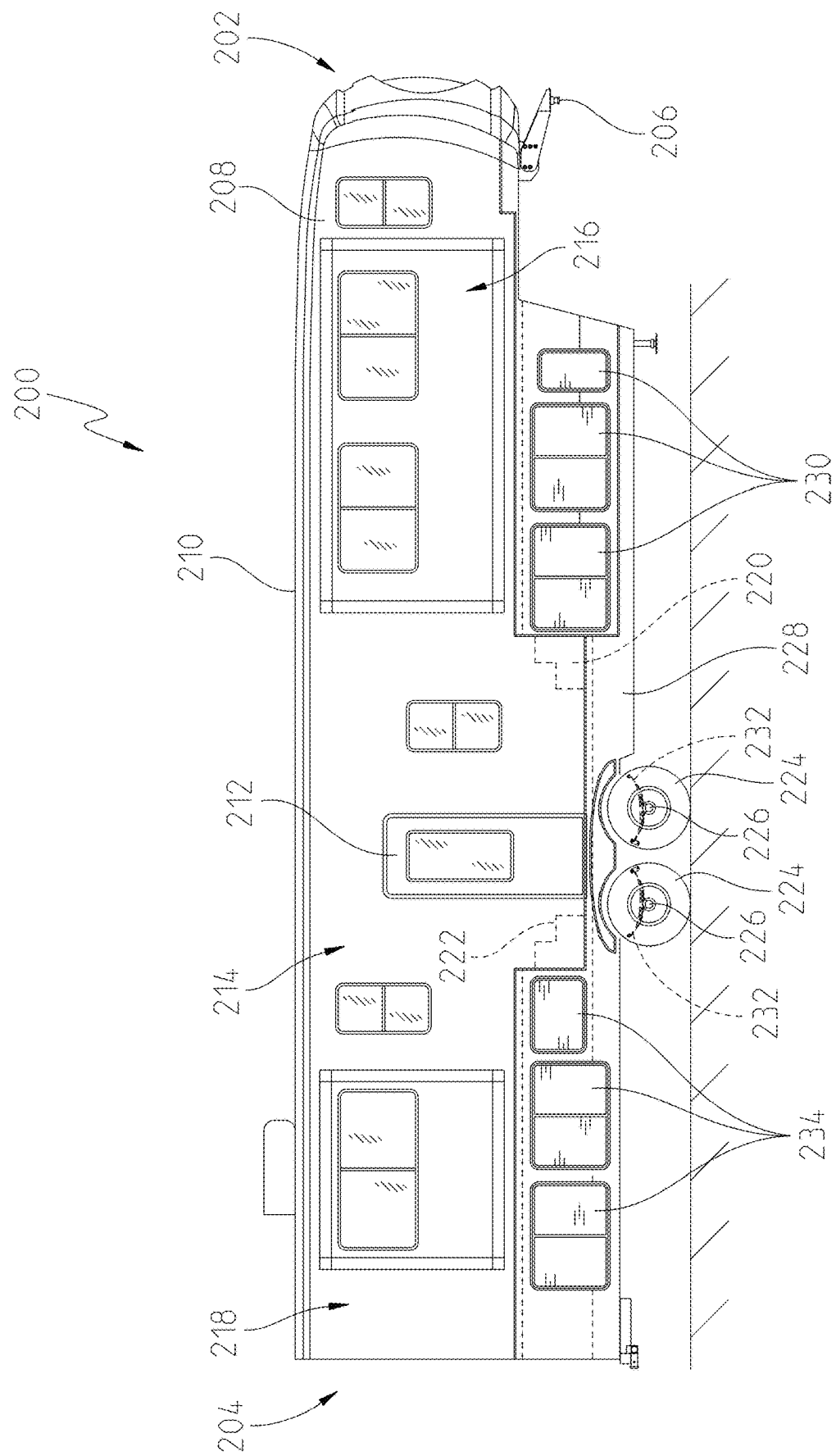
FIG. 2 is another side view of a conventional multi-level fifth wheel travel trailer.

In FIG. 2, another conventional multi-level fifth wheel travel trailer 200 is shown. The trailer 200 includes a front 202 and a rear 204, with a hitch 206 for coupling to a towing vehicle (not shown) located towards the front 202. The trailer 200 includes a body 208 supported by a chassis or drop frame (not shown). The chassis or drop frame may be supported by one or more wheels 224 located along an axle 226. The body 208 includes a roof 210 with a door 212 for providing access to an interior thereof. Skirting 228 and the like may be provided along the lower edges of the body 208 as shown. A leaf spring 232 may form part of a suspension assembly for the travel trailer 200.

The interior of the fifth wheel travel trailer 200 may include a first living area 214 immediately accessible when entering through the door 212. Although not shown, a set of steps may be provided for entering and exiting the interior of the trailer 200.

The trailer 200 may include a second living area 216 and a third living area 218, each of which is separated by the first living area 214. The second living area 216 may be located towards the front 202 and the third living area 218 may be located towards the rear 204. In each case, both living areas are located at a different level from the first living area 214. For instance, a first set of steps 220 provides access between the first living area 214 and the second living area 216, while a second set of steps 222 provides access between the first living area 214 and the third living area 218.

The travel trailer 200 of FIG. 2 also includes a first set of storage doors 230 for accessing individual storage compartments at the front 202 of the trailer. Moreover, the trailer 200 includes a second set of storage doors 234 for accessing individual storage compartments at the rear 204 of the trailer 200. The storage compartments found in the travel trailer 200 of FIG. 2 can be separated from one other by walls or partitions (not shown). The same is true of the multi-level fifth wheel travel trailer 100 of FIG. 1.

Figure 3A:
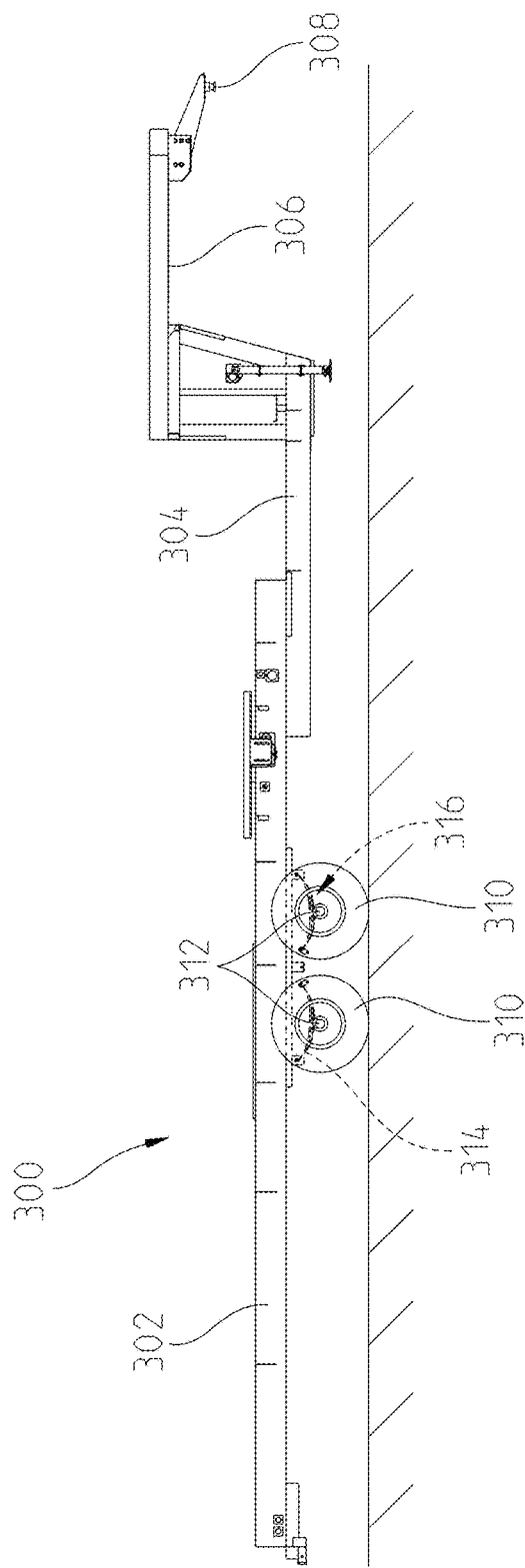
FIG. 3A is a side view of a drop frame or chassis of a fifth wheel travel trailer.

The trailers of FIGS. 1 and 2 include a conventional drop frame or chassis. An example of this is illustrated in FIG. 3A. Here, a drop frame assembly 300 includes a rear frame portion 302, a drop frame portion 304, and a front frame portion 306. The drop frame assembly 300 includes a hitch 308 at a front end thereof and one or more wheels 310 coupled thereto. The wheels 310 are located along an axle 312 of the trailer, and a leaf spring 314 may form part of a suspension assembly of the trailer. FIG. 3A shows the leaf spring 314 located above the axle 312 to form an "overslung" axle 316.

As described above and shown in FIGS. 1 and 2, conventional multi-level fifth wheel travel trailers include one or more sets of steps to reach different living areas within the interior of the trailer. This results in an end user having to traverse a lot of steps throughout a day when moving about the interior of the trailer. This can be particularly difficult for those with limited mobility. Moreover, the living areas that are elevated often include less headroom and thus can be more difficult to move about. The change in elevation between living areas can also impact the amount of storage provided in a multi-level fifth wheel travel trailer, and even those with multiple storage compartments can lose storage space. For example, a drop frame such as the one depicted in FIG. 3A can create a taller trunk which requires a user to stack items on top of one another to utilize the upper portion of the taller space. Further, it can be difficult to fit larger items in the provided storage space. Thus, there is a need for a single-level fifth wheel travel trailer that does not require steps to reach different living areas inside the trailer. It is further desirable to provide as much storage as possible while also creating additional headroom at the front and rear of the trailer.

Figure 3B:
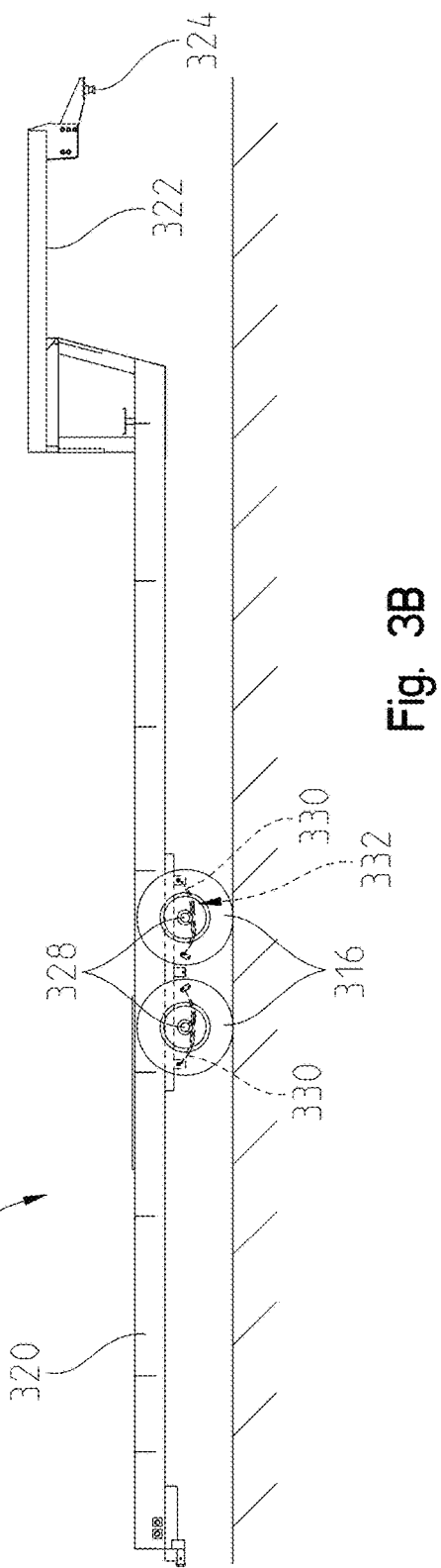
FIG. 3B is a side view of a straight frame or chassis of a fifth wheel travel trailer.

To partly achieve the foregoing, the drop frame assembly 300 of FIG. 3A can be replaced with a lighter straight frame assembly 318 shown in FIG. 3B. As shown, the straight frame assembly 318 may include a substantially straight frame 320 without the drop portion found in the embodiment of FIG. 3A. The assembly 318 includes a front frame portion 322 raised above the straight frame 320 at a front end thereof. The front frame portion 322 may include a hitch 324 for coupling to a towing vehicle. The frame assembly 318 may be supported by one or more wheels 326 which are arranged along an axle 328. A leaf spring 330 may form part of a suspension assembly, but the leaf spring 330 may be located below the axle 328 to form an "underslung" axle 332. In this embodiment, the "underslung" axle 332 may provide better traction due to a lowered center of gravity of the trailer.

Figure 4:
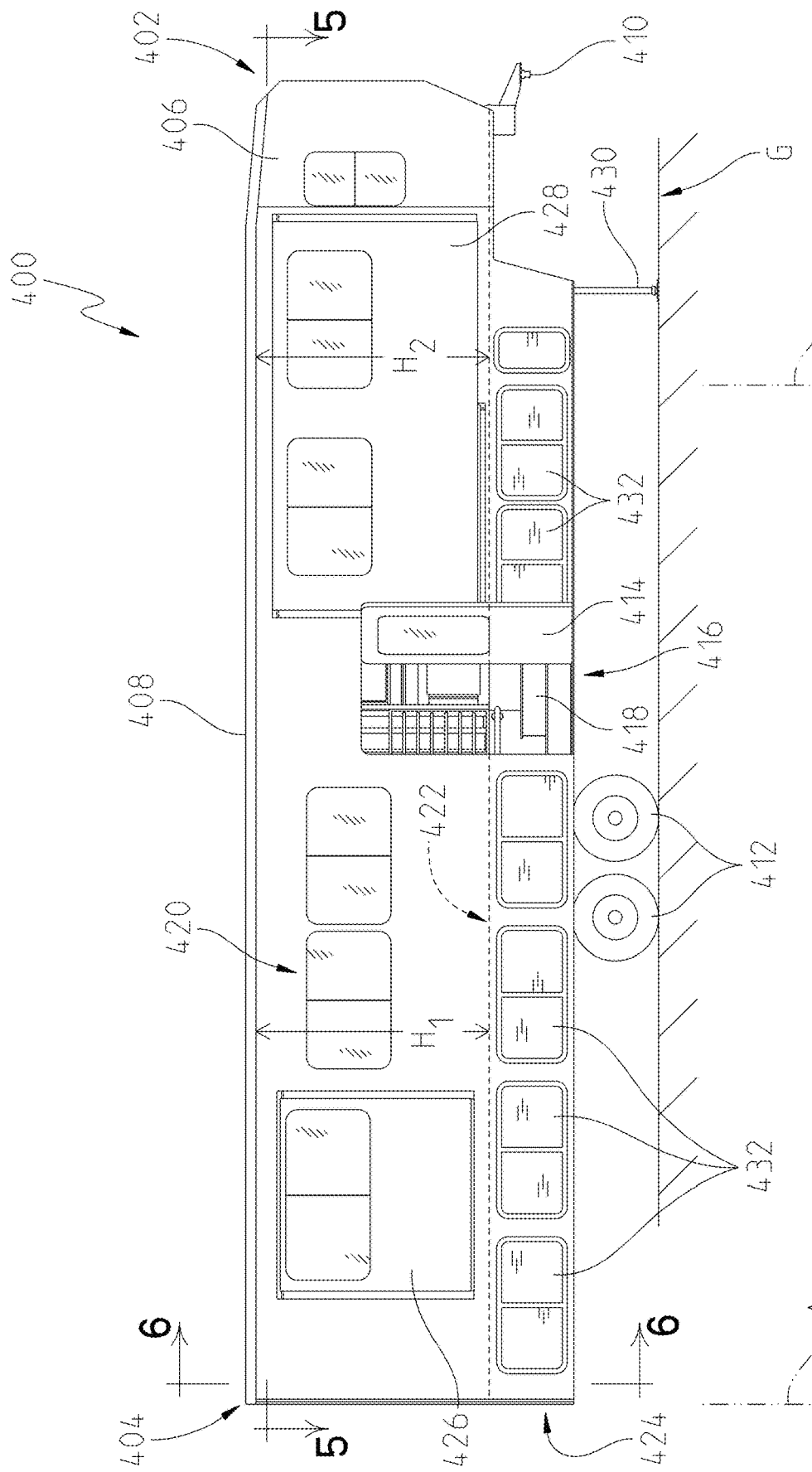
FIG. 4 is a side view of a single-level fifth wheel travel trailer.

Referring to FIG. 4, an embodiment of a single-level fifth wheel travel trailer 400 is illustrated. This ranch-style trailer 400 is different from the conventional multi-level fifth wheel travel trailers in that a user may traverse between a front end 402 and a rear end 404 of the trailer 400 without having to travel up or down steps between living areas. In one such example, an interior floor 422 of the trailer 400 may lie along a substantially horizontal plane between the front 402 and rear 404 thereof. In another example, the floor 422 may be slightly raised or lowered in certain areas (i.e., when transitioning from a first floor surface to a second floor surface), but a user is not required to travel up or down multiple steps between living areas.

The single-level trailer 400 may be formed as a body 406 supported by a frame assembly 318 as previously described. The frame assembly 318 may be lighter than the conventional drop frame assembly. The body 406 and frame assembly may be further supported by one or more wheels 412.

The body 406 may include an overhead roof 408 as shown in FIG. 4. Further, a hitch 410 may be located at the front end 402 of the trailer for coupling to a towing vehicle (not shown). When the trailer 400 is disconnected from the towing vehicle, a support member 430 or landing gear may be provided to support the front end 402 thereof.

The body 406 may include skirting, but the skirt metal is generally less than found on most conventional fifth wheel trailers due to the lack of a drop frame assembly.

A door 414 may be coupled to the body 406 to allow access between the interior of the trailer 400 and outside thereof. The door 414, when opened, allows access to an entryway 416 which may be accessed by a set of steps 418 between the ground, G, and a single-level living area 420 of the trailer 400. In one embodiment, the entryway 416 may have a width greater than the typical 30" found on most multi-level fifth wheel trailers. For instance, the passageway 416 may have a width between 30-40 inches. In a further example, the width may be between 32-38 inches. In yet a further example, the width may be approximately 36 inches.

The trailer 400 may include a first slide out 426 and a second slide out 428, which are known in the art. The slide outs, when configured in their deployed positions, allow the single-level living area 420 to increase in living space as the side wall of the body 406 moves outwardly a predetermined distance. While the trailer 400 of FIG. 4 includes a pair of slide outs, this is not intended to be limiting. The trailer 400 may include any number of slide outs for purposes of the present disclosure, including in at least one embodiment having no slide outs.

Another advantage of the single-level fifth wheel travel trailer is that the height between the floor 422 and ceiling is approximately the same throughout. In FIG. 4, a first height, $H_1$, at the rear 404 of the trailer 400 may be approximately, if not exactly, the same as a second height, $H_2$, at the front 402 thereof. For example, the heights may be up to 84 inches. Conventional multi-level fifth wheel travel trailers having varying heights throughout the interior living spaces depending upon the location therein. For instance, a conventional multi-level fifth wheel may have heights that vary between 75 inches and 105 inches, where the less headroom is normally found in those living spaces that are elevated at the front and/or rear of the trailer. In the present disclosure, the single-level fifth wheel travel trailer 400 can provide at least 80 inches of headroom over the pinbox area (e.g., where it connects to the towing vehicle) of the trailer. Conventional, multi-level fifth wheel travel trailers generally have no more than 78 inches of headroom over the pinbox area.

A further advantage of the single-level fifth wheel is that it can be easier to manage the interior temperature. There is less cubic volume of air to heat and cool due to the substantially constant ceiling between different living areas, whereas in a conventional fifth wheel the air has to travel to the different living areas at various heights. Thus, the airflow through the single-level fifth wheel travel trailer is better able to maintain the temperature throughout which reduces the overall cost of operating the trailer.

The floor level 422 separates the living space 420 of the trailer 400 from a storage compartment or basement 424. The storage compartment 424 may be accessed by any one of a plurality of storage doors 432. Unlike the individual and independent storage compartments of the conventional multi-level fifth wheel travel trailers described above, the storage compartment 424 of the single-level fifth wheel travel trailer 400 of FIG. 4 may be a full pass-through storage space that runs continuously (e.g., uninterrupted) from the rear end 404 of the trailer 400 to a location towards the front end 402 thereof. In FIG. 4, for example, the storage compartment 424 may be a continuous space defined between point A at the rear 404 and point B towards the front 402. The storage compartment 424 may be large enough for a user to crawl between points A and B. The storage compartment 424 may be formed of a single piece of composite material which can reduce the overall cost of the trailer 400. In other embodiments, the storage compartment 424 may be formed of other material besides composite.

Figure 5:
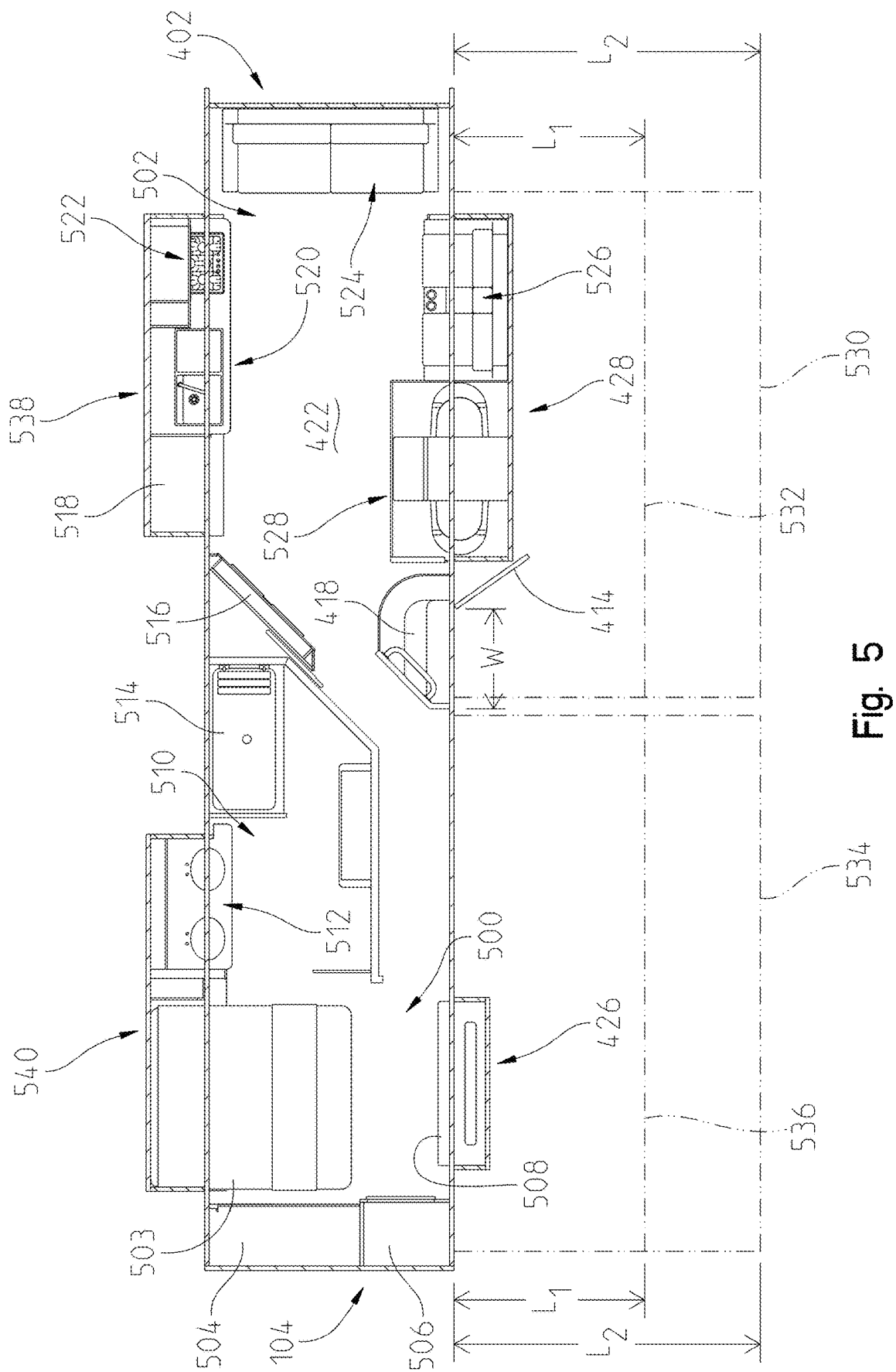
FIG. 5 is top partial cross-sectional view illustrating an example of a layout of the trailer of FIG. 4 taken along lines 2-2.

Referring to FIG. 5, one embodiment of an interior layout of the single-level fifth wheel travel trailer 400 is shown. Here, the interior layout may be divided between a first living area 500 and a second living area 502. The first living area 500 may comprise a bedroom and bathroom combination. At the rear 404 of the trailer 400, a closet 504 and space 506 for a washer and dryer may be provided. A bed 503 and a fireplace and/or entertainment system 508 may also be provided. The fireplace and/or entertainment system 508 may be assembled as part of the first slid out 426, whereas the bed 503 may be part of a fourth slide out 540. The first living area 500 may also include a bathroom 510 having one or more sinks 512 and a bath and/or shower 514.

In the second living area 502, another entertainment system 516 such as a television and/or fireplace may be provided. Utilities including a refrigerator 518, sink 520, microwave and stove top 522 may also be located in the second living area 502. A table 528 and seating may be provided as well, including a sofa area 524 and other chairs 526. The kitchen area, including the refrigerator 518, sink 520, microwave and stove top 522 may be part of a third slide out 538, whereas the table 528 and seating area 526 may be part of the second slide out 428.

The layout of FIG. 5 is not intended to be limiting to this disclosure, but rather only illustrative of how different living spaces may be arranged in a single-level fifth wheel travel trailer. It should be appreciated by one skilled in the art that the layout may look different in other embodiments without departing from the scope of the present disclosure. In other words, the first and second living areas can swap locations and still be designed as a single-level fifth wheel. Other layouts are also possible.

In FIG. 5, the single-level fifth wheel travel trailer 400 is capable of including one or more awnings. Many conventional fifth wheels come with awnings to provide shade and protection from the weather. In this embodiment, the trailer 400 may come with a first awning located at the front end 402 of the trailer 400 and a second awning located at the rear end 404 thereof. The awnings, however, may come in different sizes. For instance, a first short awning 532 may extend a distance $L_1$ from the side wall of the trailer 400. In one non-limiting example, $L_1$ may be approximately 8 feet when the awning 532 is in its deployed position. A first long awning 530 may replace the first short awning 532, and it may extend a distance $L_2$. In one non-limiting example, $L_2$ may be approximately 2 feet greater than $L_1$ such that the first long awning 530 is approximately 10 feet in length.

In the rear 404, a second short awning 536 may extend a distance $L_1$ from the side wall of the trailer 400. In one non-limiting example, $L_1$ may be approximately 8 feet when the awning 536 is in its deployed position. A second, long awning 534 may replace the second short awning 536, and it may extend a distance $L_2$. In one non-limiting example, $L_2$ may be approximately 2 feet greater than $L_1$ such that the first long awning 534 is approximately 10 feet in length.

The awning lengths are provided above only as examples, and the awnings may be different sizes particularly depending on the length of the trailer. Moreover, the length of the first awning may be different than the length of the second awning. Further yet, the trailer 400 may include awnings on both sides thereof (even though the awnings are only shown on one side in FIG. 5). The awnings may be stored in a rolled up condition as shown in FIG. 6. The awnings may be coupled to elongate rails that extend a portion of the length of the trailer. The elongate rails can be mounted to the body 406 of the trailer 400 and extend approximately to a rear edge or front edge thereof.

In FIG. 6, the second and fourth slide outs 428, 540 are shown disposed in their deployed positions. In this embodiment, the second slide out 428 is located a height, $H_5$, above the ground, G. The fourth slide out 540 is located a height, $H_4$, above the ground, G. The heights, $H_4$ and $H_5$, are approximately 6 feet or more to enable a person to walk underneath the slide outs when deployed. As such, the slide outs can function as mini-awnings and improve patio usability, particularly when it is too windy to deploy the awnings.

As also shown in FIG. 6, the storage compartment 424 may have a height, $H_3$, and a width, $W_2$, to allow adequate storage therein. As described above, a person may access the entire pass-through storage compartment 424 between points A and B.

The storage compartment 424 is also large enough such that an air conditioner, furnace, water heater, or other utility equipment 600 may be located therein. It can be further advantageous to locate the aforementioned utility equipment such as the air conditioner unit, furnace, air heater, etc. in the storage compartment for service needs. Specifically, the equipment 600 may be arranged in the compartment 424 such that access to each side of the equipment 600 may be accessed by a user or service worker. It can also be easier to replace the unit due to this increased access. Further, the equipment 600 is located in a climate-controlled storage compartment 424 which may improve its durability and useful operating life.

Many conventional multi-level fifth wheel trailers position the air conditioner unit on the roof. In doing so, this limits the overall height of the trailer. Moreover, condensation runs off the roof and collects in drain cups. Discoloration can result along the roof and sides of the trailer as condensation runs off. With the air conditioner and other utility equipment 600 located in the storage compartment 424, a drain (not shown) may be installed in the floor of the compartment to allow condensation to drain therefrom without causing the issues that arise with conventional multi-level fifth wheel trailers.

In another embodiment, air ducts, pipes, lines, wires, and the like may also be located in the storage compartment 424 and run the length of the fifth wheel trailer 400. This can be advantageous because the airflow can be pushed through vents in the floor 422 to both heat and cool the living space 420 more evenly and efficiently.

In contrast, conventional fifth wheel trailers locate air ducts and the like on the roof, thereby being subjected to the sun and other environmental elements. On a hot, sunny day, it can often require more energy to cool the air through the ducts when located on the roof of the trailer and unprotected from the sun.

With the utilities and air ducts in the storage compartment 424, it can be easier to control the temperature inside the trailer 400 compared to the aforementioned conventional multi-level trailers.

The aforementioned fifth wheel travel trailer 400 is designed such that it complies with National Fire Protection Association (NFPA) 1192 codes, which is a standard on recreational vehicles. Large semitrailers do not comply with these codes since they are not recreational vehicles, and thus the present disclosure is not intended to cover these types of semitrailers.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A recreational travel trailer, comprising:
a frame;
one or more wheels for supporting the frame on a ground surface;
a body supported by the frame, the body having a length defined between a front end and a rear end of the body;
a roof coupled to the body and extending from the front end to the rear end;
an interior space defined in the body between a floor and the roof, the interior space being located at a first height above the ground surface;
at least one step coupled to the frame and located between the floor and the ground surface, the at least one step configured to provide access to the floor; and
a single storage compartment at least partially formed by the body, the storage compartment located below the floor of the interior space and forming an interior that extends at least half of the length of the frame;
wherein, the floor is defined along a plane from the rear end of the body to a location near the front end thereof such that the interior space is accessible without traversing more than a single step;
wherein, a second height is defined between the floor and the roof at the front end of the body, a third height is defined between the floor and the roof at the rear end of the body, where the second height and the third height is substantially the same.

2. The travel trailer of claim 1, wherein the floor is defined along the plane from the rear end to the front end.

3. The travel trailer of claim 1, further comprising a storage door coupled to the body for accessing the storage compartment.

4. The travel trailer of claim 1, wherein the one or more wheels are rotatable about an axle, the axle being an underslung axle.

5. The travel trailer of claim 1, wherein the interior of the storage compartment is open between the rear end and a location adjacent the front end.

6. The travel trailer of claim 5, further comprising utility equipment disposed within the interior of the storage compartment.

7. The travel trailer of claim 6, wherein the utility equipment comprises at least one of an air conditioner unit, a furnace, and a water heater.

8. The travel trailer of claim 7, further comprising a drain defined in a floor surface of the storage compartment, the drain being located near the utility equipment for water to drain out of the storage compartment.

9. The travel trailer of claim 5, further comprising an air duct located in the interior of the storage compartment.

10. The travel trailer of claim 1, further comprising at least one slideout coupled to the body, the slideout being movable between a stowed position and a deployed position.

11. The travel trailer of claim 1, further comprising at least one awning coupled to the body.

12. The travel trailer of claim 1, wherein:
the interior space is defined between a ceiling, the floor, and one or more walls formed by the body;
a distance between the ceiling and the floor is substantially the same throughout the interior space.

13. A recreational vehicle, comprising:
a frame including a hitch;
one or more wheels for supporting the frame on a ground surface;
a body supported by the frame, the body having a length defined between a front end and a rear end of the body;
a roof coupled to the body and extending from the front end to the rear end;
an interior space defined in the body between a floor and the roof;
a door for providing entry to the interior space; and
a storage compartment at least partially formed by the body, the storage compartment being located below the floor of the interior space;
wherein, the storage compartment comprises an interior defined on each side by one or more side walls, the storage compartment having a first end located at the rear end of the body and a second end located near the front end, the interior being defined as a single, pass-through space that provides uninterrupted access between the first end and the second end.

14. The recreational vehicle of claim 13, wherein the storage compartment is formed of a single piece of composite material.

15. The recreational vehicle of claim 13, further comprising a storage door coupled to the body for gaining access to the interior of the storage compartment.

16. The recreational vehicle of claim 13, wherein, the floor is defined along a horizontal plane from the rear end of the body to a location near the front end thereof such that the interior space is traversable therebetween without encountering more than a single step.

17. The recreational vehicle of claim 16, further comprising one or more steps for accessing the interior from the ground surface.

18. The recreational vehicle of claim 13, further comprising utility equipment disposed within the interior of the storage compartment.

19. A recreational travel trailer, comprising:
a frame comprising a straight frame portion and a raised portion;
a body supported by the frame, the body having a length defined between a front end and a rear end of the body;
an interior space defined in the body between a floor and a ceiling, the interior space spanning a length from the rear end to a location near the front end;
a storage compartment at least partially formed by the body and being located below the floor of the interior space, the storage compartment comprising an interior having a first end located proximate the rear end of the body and a second end located proximate the front end, the interior being open between the first end and the second end; and at least one storage door coupled to the body and providing access to the interior of the storage compartment.

20. The recreational travel trailer of claim 19, wherein:

the floor is defined along a horizontal plane from the rear end of the body to a location proximate the front end thereof;

a height of the interior space defined between the floor and the ceiling remains substantially the same the entirety of the length of the interior space.

* * * * *